United States Patent
Grube et al.

(10) Patent No.: US 8,402,344 B2
(45) Date of Patent: Mar. 19, 2013

(54) METHOD AND APPARATUS FOR CONTROLLING DISPERSED STORAGE OF STREAMING DATA

(75) Inventors: Gary W. Grube, Barrington Hills, IL (US); Timothy W. Markison, Mesa, AR (US)

(73) Assignee: Cleversafe, Inc., Chicago, IL (US)

( * ) Notice: Subject to any disclaimer, the term of this patent is extended or adjusted under 35 U.S.C. 154(b) by 291 days.

(21) Appl. No.: 12/797,208

(22) Filed: Jun. 9, 2010

(65) Prior Publication Data

US 2011/0083053 A1    Apr. 7, 2011

Related U.S. Application Data

(60) Provisional application No. 61/248,548, filed on Oct. 5, 2009.

(51) Int. Cl.
   *H03M 13/00* (2006.01)
(52) U.S. Cl. .......................... 714/763; 71/786
(58) Field of Classification Search .................. 714/763, 714/770, 752, 786
   See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,516,436 B1 * | 2/2003 | Dave et al. ................ | 714/753 |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Esaw Abraham
(74) *Attorney, Agent, or Firm* — Garlick & Markison; Timothy W. Markison

(57) ABSTRACT

A method begins by a processing module determining properties of streaming data. The method continues with the processing module determining required dispersed storage resources based on the properties of the streaming data, identifying a plurality of sets of dispersed storage resources, and establishing first error coding dispersed storage function parameters for a first set of dispersed storage resources of the plurality of sets of dispersed storage resources when the required dispersed storage resources requires the plurality of sets of dispersed storage resources. In addition, the method continues with the processing module enabling partitioning of the streaming data into a plurality of data streams and enabling routing of a first data stream of the plurality of data streams to the first set of dispersed storage resources, wherein the first set of dispersed storage resources converts the first data stream into pluralities of error coded data slices.

20 Claims, 10 Drawing Sheets

U.S. PATENT DOCUMENTS

| | | | |
|---|---|---|---|
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,418,049 B2* | 8/2008 | Wallace | 375/261 |
| 7,665,006 B2* | 2/2010 | Song et al. | 714/752 |
| 7,911,539 B2* | 3/2011 | Choi et al. | 348/614 |
| 8,023,532 B2* | 9/2011 | Rainish | 370/479 |
| 8,060,663 B2* | 11/2011 | Murray et al. | 710/8 |
| 8,093,942 B2* | 1/2012 | Pitsch et al. | 329/300 |
| 8,121,017 B2* | 2/2012 | Stadelmeier et al. | 370/203 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner

METHOD AND APPARATUS FOR CONTROLLING DISPERSED STORAGE OF STREAMING DATA

CROSS REFERENCE TO RELATED PATENTS

This patent application is claiming priority under 35 USC §119 to a provisionally filed patent application entitled MULTIMEDIA DISTRIBUTED STORAGE NETWORK, having a provisional filing date of Oct. 5, 2009, and a provisional Ser. No. 61/248,548.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

DETAILED DESCRIPTION OF THE INVENTION

Figure 1:
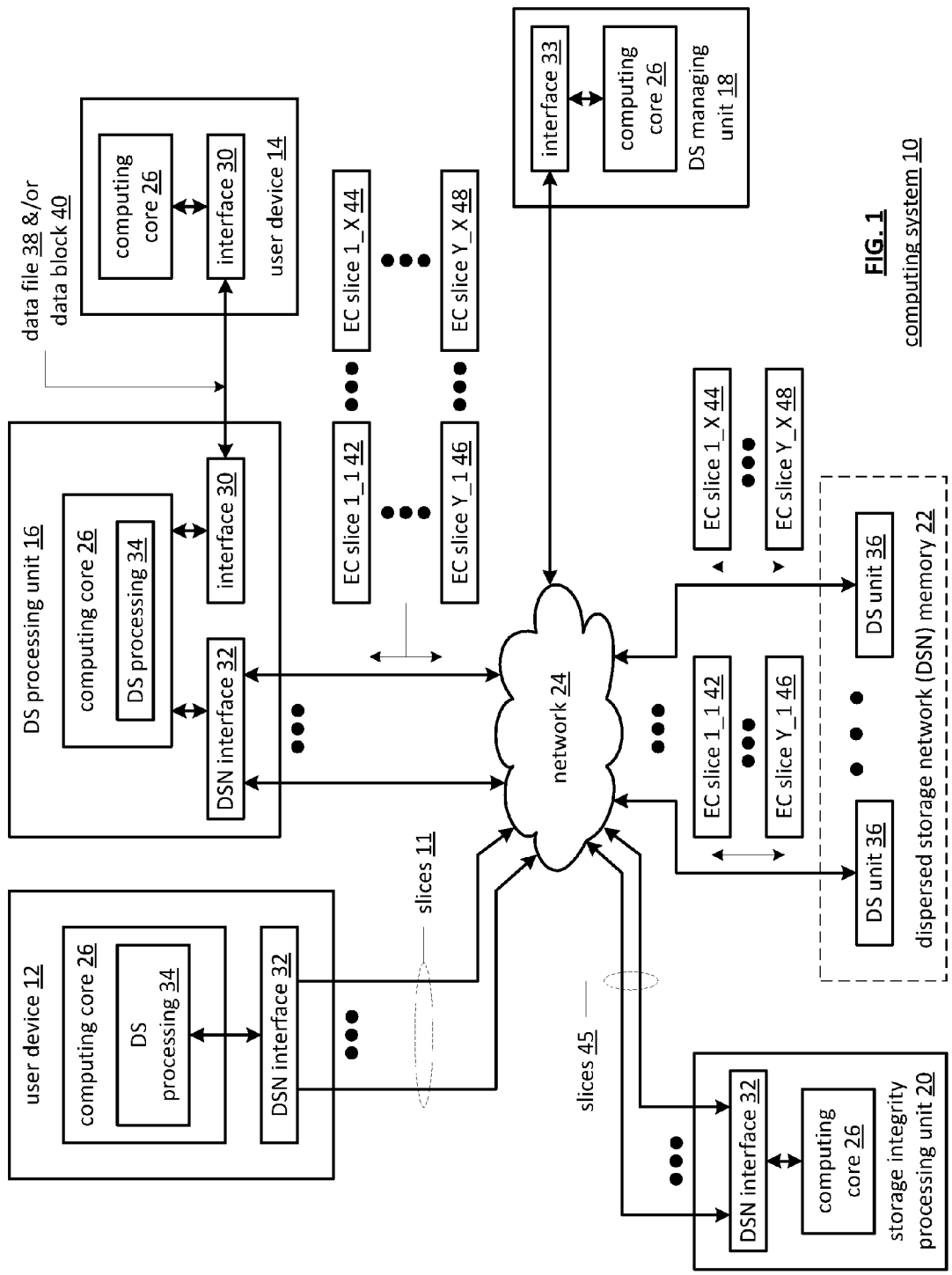
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-11.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to 2" bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-11.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
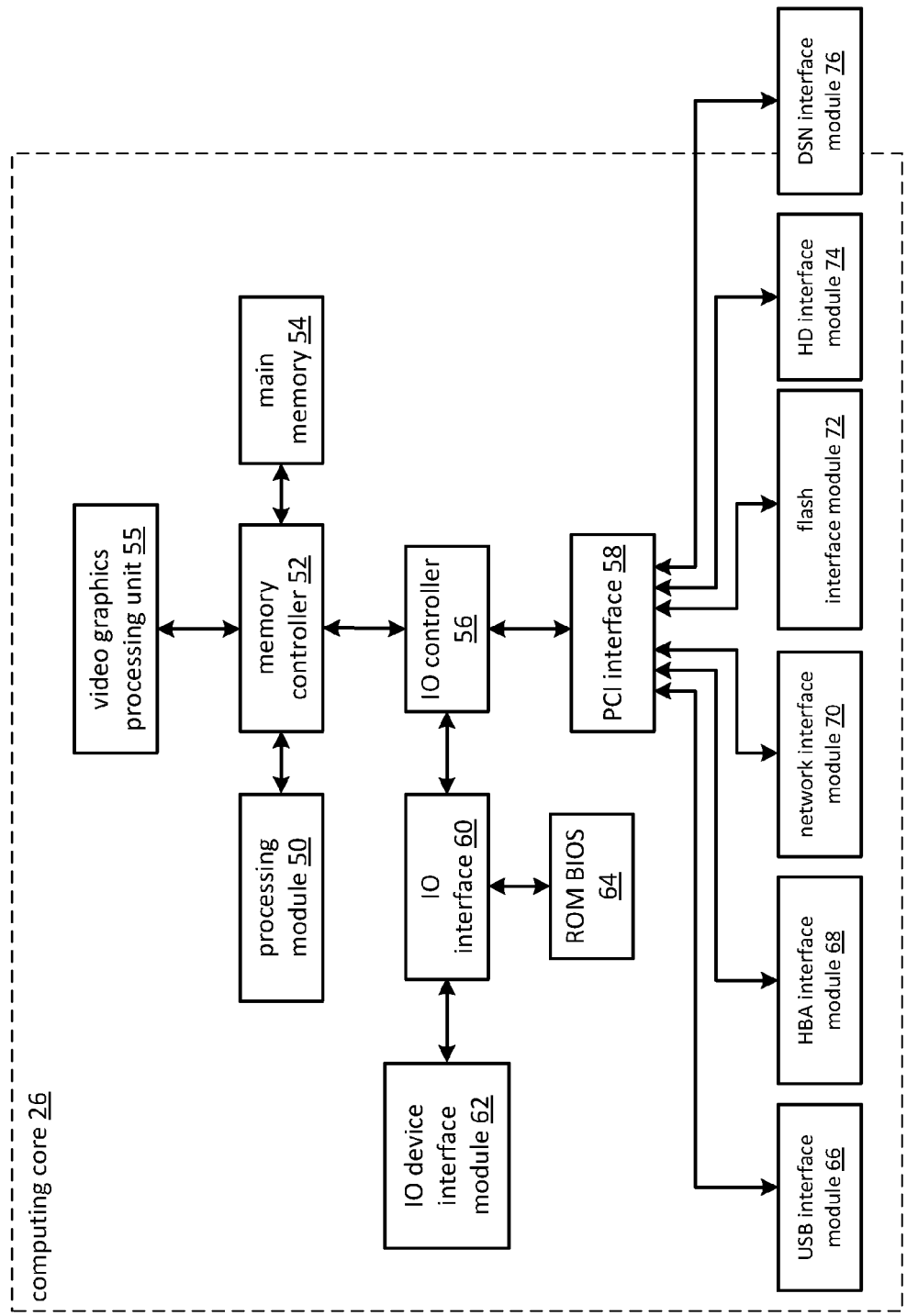
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, at least one I/O device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the I/O device interface module 62 and/or the memory interface modules may be collectively or individually referred to as I/O ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-11.

Figure 3:
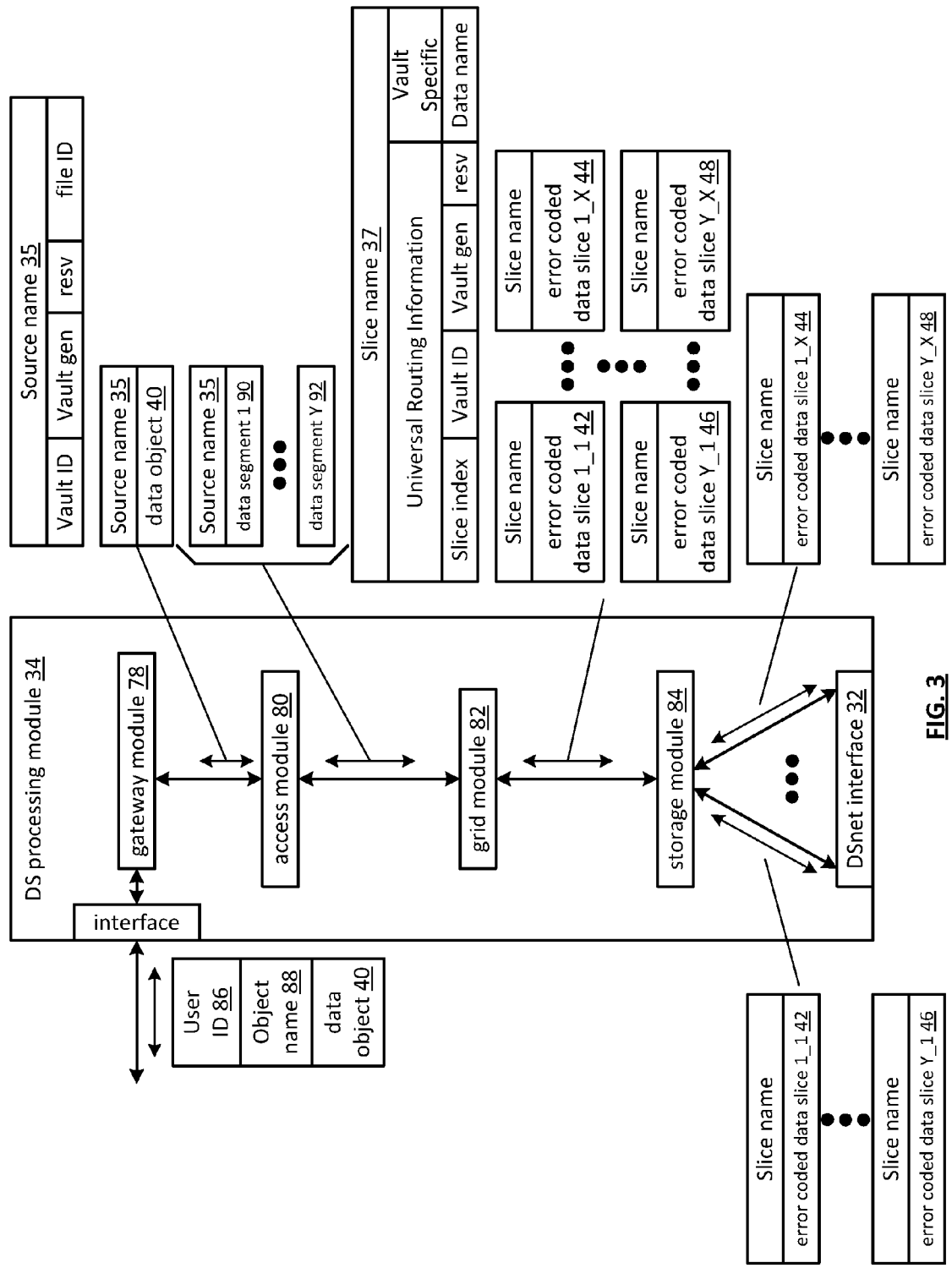
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module. The storage module then outputs the encoded data slices 1 through X of each segment 1 through Y to the DS storage units. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
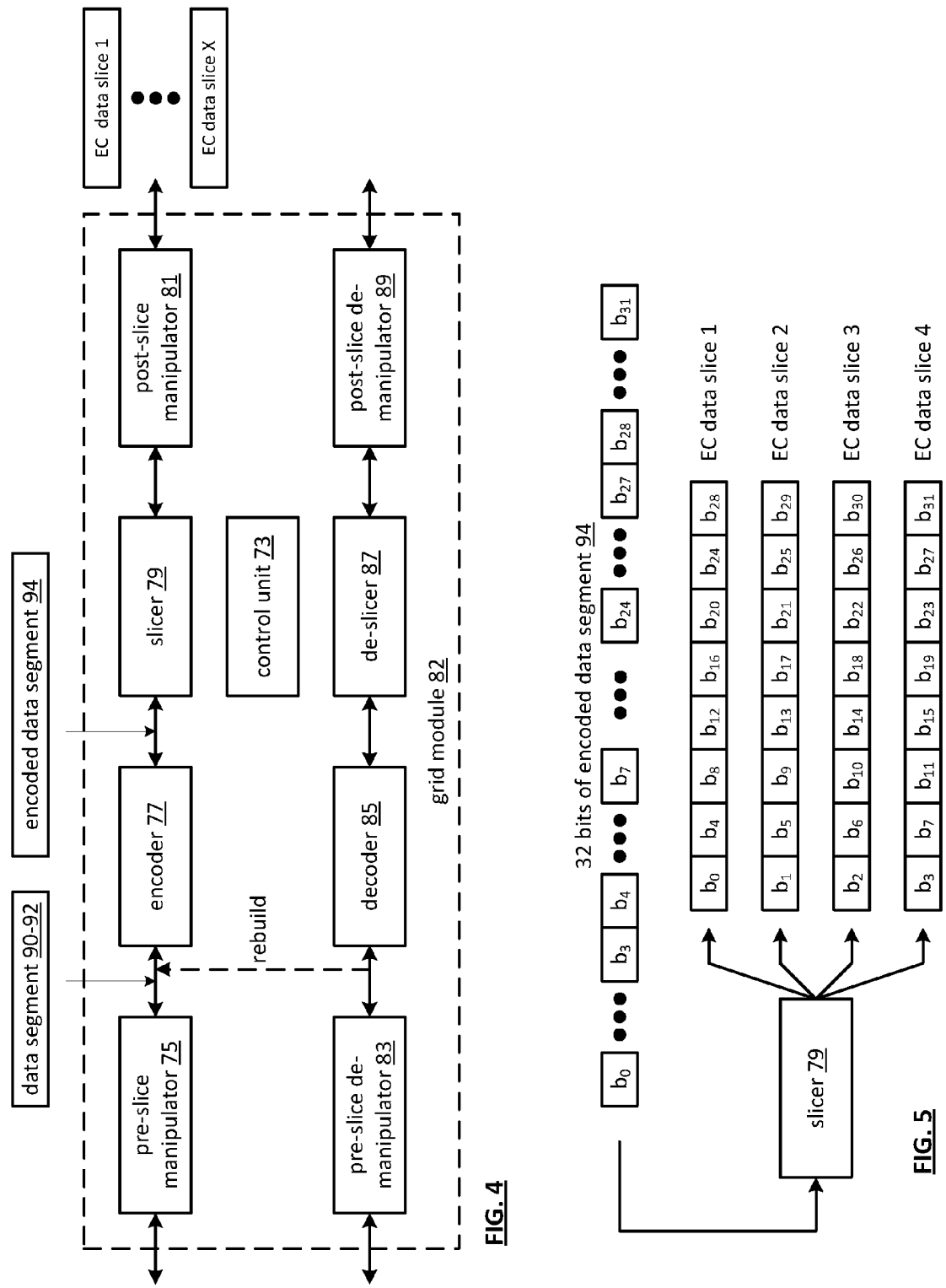
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
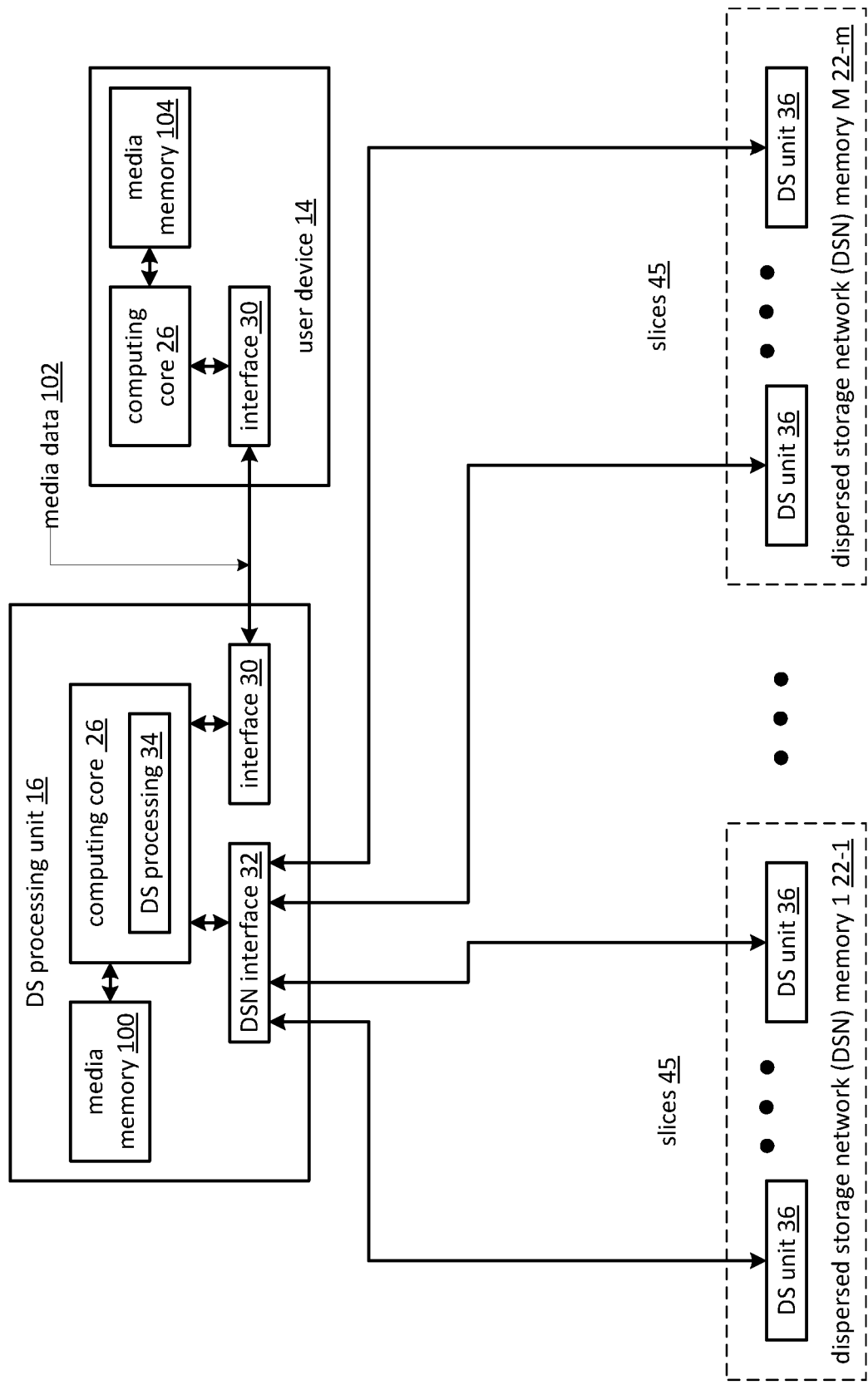
FIG. 6 is a schematic block diagram of an embodiment of a system to distributedly store media data in accordance with the invention.

FIG. 6 is a schematic block diagram of an embodiment of a system to distributedly store media data. The system includes at least one user device 14, a DS processing unit 16, and one or more DSN memories 1-M 22-1 through 22-M. Generally, the DS processing unit 16 determines if there is media data 102 contained in the user device 14 to be stored in one or more of the DSN memories 1-M 22-1 through 22-M.

The user device 14 (e.g., a portable camcorder, cell phone, wireless device) includes a media memory 100, the computing core 26, and the interface. In another embodiment, the computing core 26 includes DS processing 34 to facilitate direct coupling of the user device 14 to the DSN memories 1-M 22-1 through 22-M. The media memory 104 may temporarily store media data 102 (e.g., multimedia, sound files, video files).

The DS processing 16 unit includes a media memory 100 through 104, the computing core 26, the interface 30, and the DSN interface 32. In an embodiment, the DS processing unit 16 is implemented as a cable TV set top box. Note that the computing core 26 supports the DS processing 16 as previously discussed. The media memory 100 through 104 may temporarily store media data 102 (e.g., multimedia, sound files, video files) from the user device 14 while the media data 102 is being processing preceding storage in one or more of the DSN memories 1-M 22-1 through 22-M.

In an embodiment, the DSN memories 1-M 22-1 through 22-M may correspond to layers with respect to the DS processing unit 16. For example, DSN memory 1 22-1 may comprise a first layer of other DS processing units 16 (e.g., set top boxes with media memory 100 through 104) in a close vicinity of the DS processing unit 16 (e.g., in the same building). DSN memory 2 may comprise a second layer of other DS processing units 16 (e.g., set top boxes with media memory 100 through 104) in an area just beyond the local vicinity of the DS processing unit 16 (e.g., on the same block). The layers example may continue such that layer M may comprise a global layer of other DS processing units 16 or DS units 36.

The user device 14 may communicate with the DS processing unit 16 via the interface 30 and may receive a media memory interrogation request from the DS processing unit 16 and may send a media memory 102 interrogation request response. The interface may operate in accordance to an industry standard including wired standards (e.g., USB, IEEE 1394, Ethernet, etc.) and wireless standards (e.g., 802.11, GSM, Bluetooth, LTE, WiMAX, tec.). The media memory 100 through 104 interrogation request response may include a user device 14 file directory and/or transferring media data 102 from the user device 14 media memory 100 through to the DS processing unit 16 for subsequent processing and potential storage in one or more of the DSN memories 1-M 22-1 through 22-M.

The processing module of the DS processing 34 (e.g., in the DS processing unit 16 and/or user device 14) determines if there is new media data 102 present in the media memory 100 through 104 of the user device 14 by sending the media memory 100 through 104 interrogation request to the user device 14. The processing module may send the user device 14 a media data 102 request when the processing module receives the media memory 100 through 104 interrogation request response indicating that new media data 102 is present in the user device 14. The processing module receives the media data 102 from the user device 14 and temporarily stores the media data 102 in the media memory 100 through 104 of the DS processing unit 16.

The processing module determines metadata associated with the media data 102 including one or more of file type, timestamp, location of the source media, user entered data, user ID, pattern matching of the media data 102 (e.g., people, vehicles, buildings, roads, landmarks, etc.).

The processing module determines what portions of the media data 102 to store based in part on the metadata (e.g., new video of person X).

The processing module determines how to create EC data slices 45 of the media data 102 and where to store the slices 45 (e.g., which DSN memories 22-1 through 22-M) based in part on the metadata (e.g., high reliability, the lowest cost DSN memory 22-1 through 22-M, the first layer DSN memory 22-1 through 22-M). The processing module sends the EC data slices 45 with a store command to the selected DSN memory 22-1 through 22-M in accordance with the determination.

Figure 7:
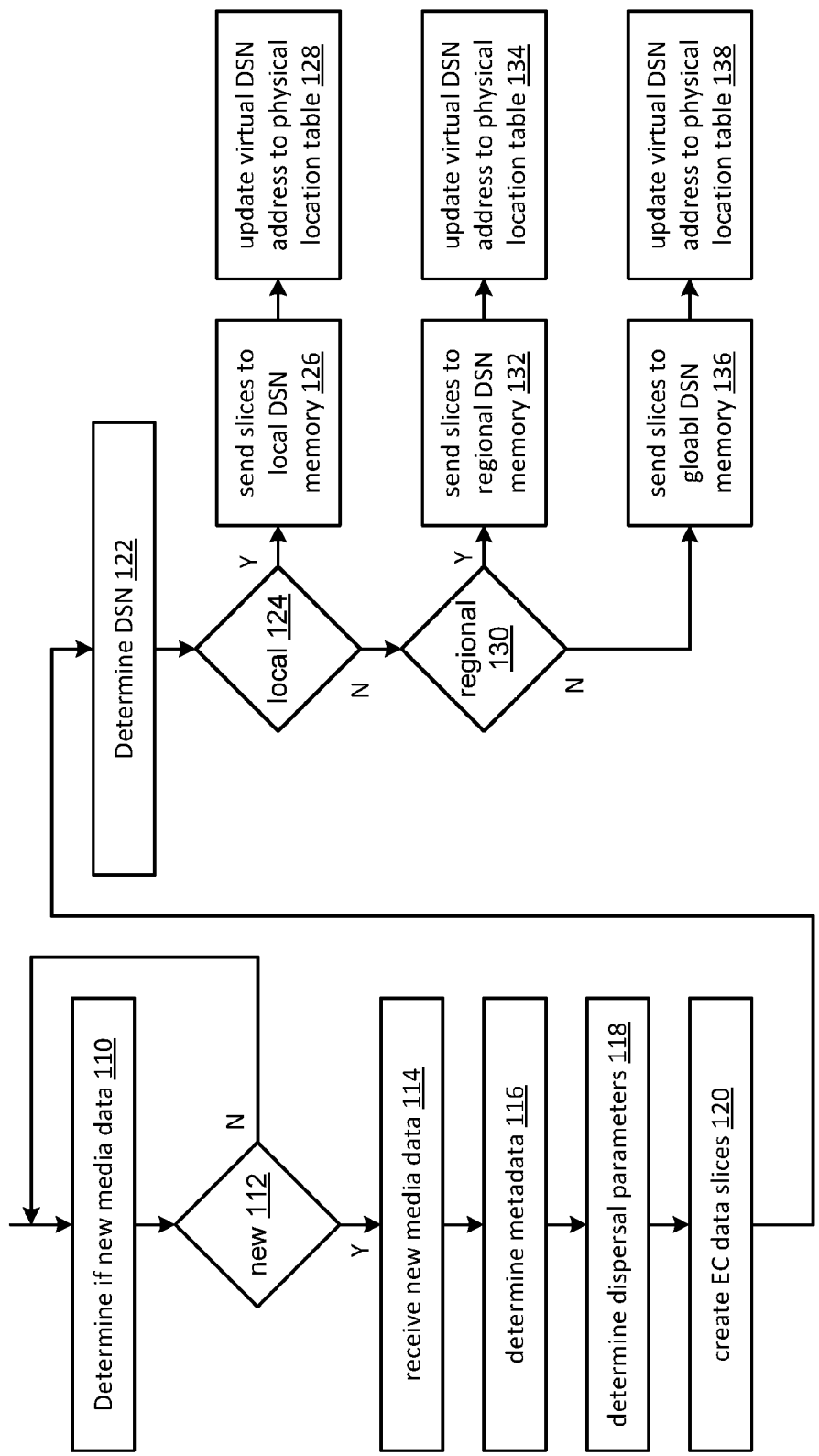
FIG. 7 is a flowchart illustrating the processing of media data.

The method of operation is discussed in greater detail with reference to FIG. 7. FIG. 7 is a flowchart illustrating the processing of media data where the DS processing stores media from the user device.

The processing module of the DS processing establishes communication with the user device and determines if there is new 112 media data in the media memory of the user device that has not been stored in the DSN memory and should be stored in the DSN memory. The determination may be based on the processing module comparing a local 124 directory of media data (e.g., object names) from the user device and to the DSN user directory of object names. The method continues to look for new 112 media data while the user device is connected to the DS processing unit when the processing module determines that there is no new media data in the media memory of the user device.

The processing module receives the new media data 114 from the user device and stores the media data in the media memory of the DS processing unit.

The processing module determines metadata associated with the media data based on one or more of metadata appended to the media data, analysis of the media data, via a message from the user device, and/or sending the media data for analysis to another entity and receiving a response. Note that the metadata content was previously discussed.

The processing module determines what portions of the media data to store. The determination may be based on one or more of the metadata, a predetermination, a list, a command, analysis of the media data, a motion detector, file type, a priority, and/or a pattern matcher.

The processing module determines dispersal parameters for the EC data slices of the media data based on one or more of the user vault operational parameters, the metadata, a file type, a priority, costs, estimate frequency of retrievals, estimated desired retrieval speeds, reliability, estimated duration of storage, size, type of media data, and/or a command. The processing module creates the EC data slices 120 based on the dispersal parameters.

The processing module determines which DSN memory to send the slices to for storage based in part on the metadata (e.g., high reliability, the lowest cost DSN memory, the first layer DSN memory), the dispersal parameters, and memory characteristics of the DSN memories 1-M. In other words, the processing module determines the most favorable match of DSN memory to the inferred requirements from the metadata and dispersal parameters. For example, the processing module may choose DSN memory 1 (e.g., local layer in the same building) when the requirements include lowest cost with modest reliability.

The processing module sends the EC data slices with a store command to the local DSN memory when the local 124 DSN memory layer is selected. The processing module updates the virtual DSN address to physical location table to indicate where to retrieve the slices for this media data.

The processing module sends the EC data slices with a store command to a regional DSN memory when the regional DSN memory layer is selected. The processing module updates the virtual DSN address to physical location table 138 to indicate where to retrieve the slices for this media data.

The method continues such that any number of memory layers may be available for choice until the processing module sends the EC data slices with a store command to a global DSN memory when the global DSN memory layer is selected. The processing module updates the virtual DSN address to physical location table to indicate where to retrieve the slices for this media data.

Figure 8:
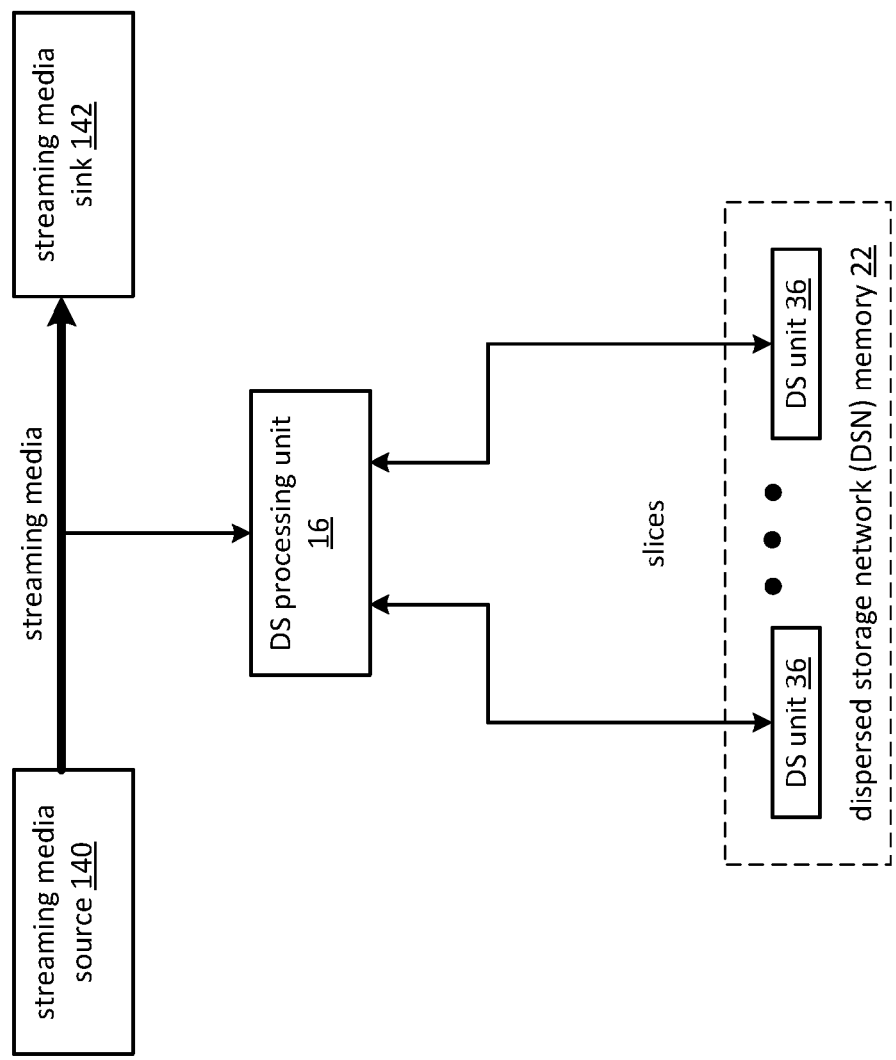
FIG. 8 is a schematic block diagram of an embodiment of a system to distributedly store streaming media in accordance with the invention.

FIG. 8 is a schematic block diagram of an embodiment of a system to distributedly store streaming media where streaming media is stored as EC data slices in a distributed storage network memory system. The streaming media that may be stored in the DSN memory while simultaneously been sent from a streaming media source to a streaming media sink 142 in real time (e.g., live TV broadcast). The streaming media may be subsequently reconstructed based on retrieval of the corresponding EC data slices from the DSN memory.

The system includes the streaming media source 140, the streaming media sink 142, a DS processing unit 16, and a DSN memory. Note that a DS processing module within the DS processing unit may implement the storing and retrieval of the streaming media. In other examples of implementation, the DS processing module may be implemented in a user device, a DS managing unit, storage integrity processing unit, and/or a DS unit. The streaming media source 140 may send the streaming media sink 142 media that may include one or more streams including high definition TV (HDTV), standard definition TV, (SDTV), music, broadcast radio channels, internet broadcasts, TV broadcast network feeds, IP telephony, wireless communications, internet backbone communication, enterprise intranet communication, communications assistance for law enforcement act (CALEA) information, telephony system trunks, fiber optic cables, and/or satellite link feeds. A typical individual stream may utilize 1, 5, 10, 15, 20 or even 40 mega-bits per second of bandwidth. The composite streaming media may contain thousands of individual streams placing a high processing demand on the storage system.

In an example of operation, the DS processing unit 16 receives the streaming media as a "T-connection" to the link from the streaming media source 140 to the streaming media sink 142 without any ability to control the flow of the stream. In another example, the DS processing unit 16 terminates the streaming media from the streaming media source 140 to with or without any ability to control the flow of the stream.

The DS processing unit 16 may utilize encoding and slicing resources such that parallel processing of more than one section of the streaming media may facilitate improved performance (e.g., to keep up with the streaming media). Alternatively, the streaming media is transcoded or compressed to reduce the bit rate prior to storage. The operation of the DS processing unit is discussed in greater detail with reference to FIGS. 9-11.

Figure 9:
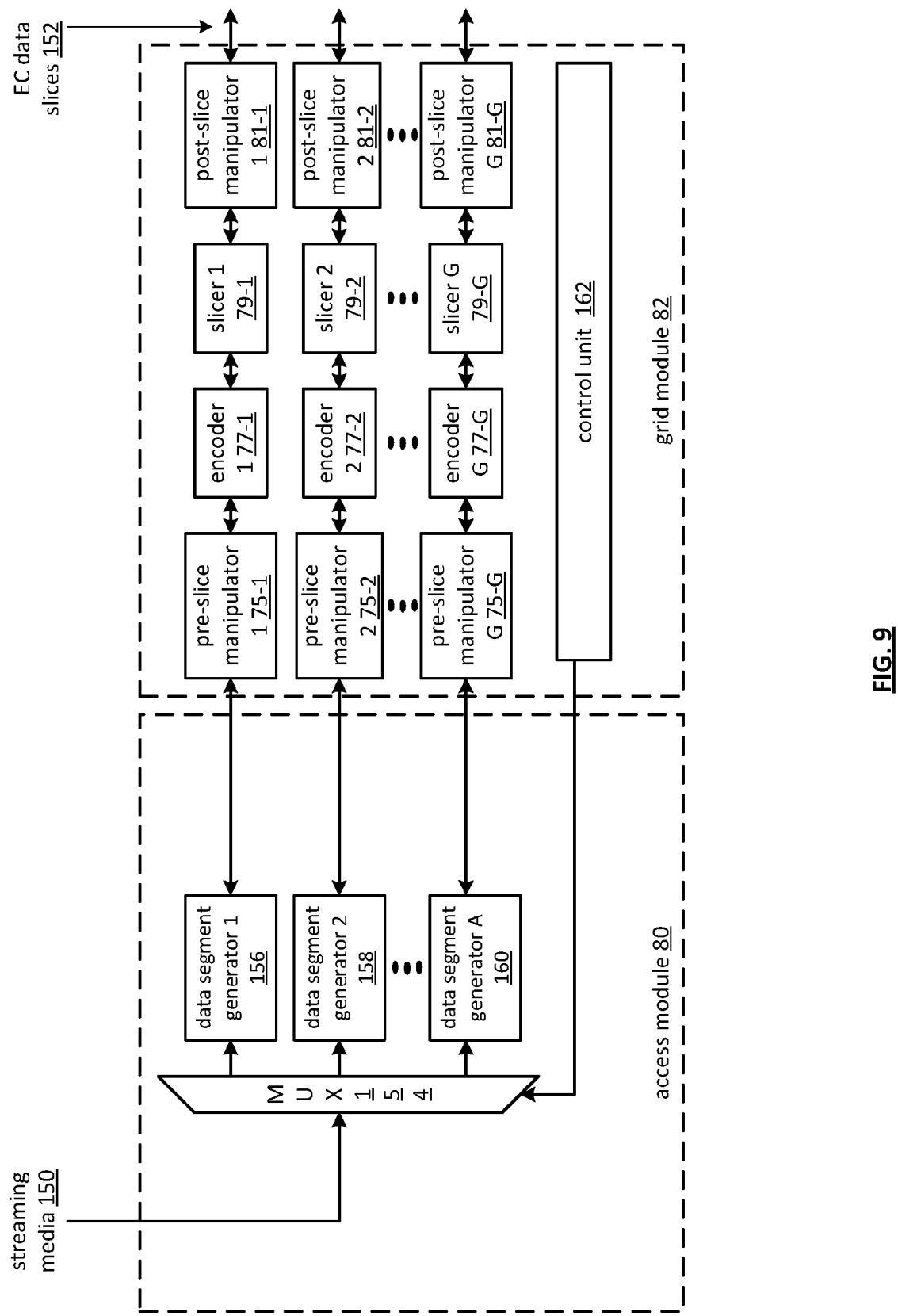
FIG. 9 is a schematic block diagram of an embodiment of an access module and grid module pair in accordance with the invention.

FIG. 9 is a schematic block diagram of an embodiment of an access module and grid module pair of a DS processing unit to receive streaming media and produce EC data slices for storage in the DSN memory. Note that the streaming media may include streaming data. The streaming data further includes one or more of but not limited to high definition video, standard definition video, multi-media, music, broadcast, telephony, internet data, intranet data, communications assistance for law enforcement act (CALEA) information, and communication system link information. Note that the properties of the streaming data includes one or more of but not limited to file type, timestamp, data stream rate, resolution, aspect ratio, protocol indication, source location, user entered data, user ID, and pattern matching information.

As illustrated, the access module 80 includes a MUX 154, and a plurality of data segment generators 1-A 156 through 160. As illustrated, the grid module 82 includes a plurality of pre-slice manipulators 1-G 75-1 through 75-G, a plurality of encoders 1-G 77-1 through 77-G, a plurality of slicers 1-G 79-1 through 79-G, a plurality of post-slice manipulators 1-G 81-1 through 81-G, and a control unit 162. Note that the grid module 82 may also include a post-slice de-manipulator 89, a de-slicer 87, a decoder 85, and a pre-slice de-manipulator 83 to facilitate data retrieval from the DSN memory as previously discussed. Further note that the control unit 162 may be implemented within any other modules of the DS processing unit and may further operably couple to any of the other modules to facilitate control of any of the other modules.

A processing module of the control unit 162 may determine the properties of the streaming data. The determination may be based on one or more of but not limited to reading a portion of the streaming data, analysis of a timed sequence of the streaming data, a table lookup, a command and a message. The processing module determines required dispersed storage resources based on the properties of the streaming data. Note that the dispersed storage resources may include elements of the access module 80 and/or of the grid module 82. Further note that the processing module may determine the required dispersed storage resources as one or more sets of dispersed storage resources. For example, a set of dispersed storage resources may include data segment generator 156, pre-slice manipulator 75-1, encoder 77-1, slicer 79-1, and post-slice manipulator 81-1. Note that two or more sets of dispersed storage resources may form a plurality of sets of dispersed storage resources.

In an example of operation, the processing module determines the required dispersed storage resources by interpreting a rate of the streaming data (e.g., by measuring or by interpreting a property) and comparing the rate of the streaming data to capabilities of a plurality of sets (e.g., different combinations of resources) of dispersed storage resources to produce a comparison. The processing module determines that the comparison is unfavorable when the comparison indicates that more than one set of the plurality of sets of dispersed storage resources are required. The processing module indicates that the required dispersed storage resources selection requires the plurality of sets of dispersed storage resources when the comparison is unfavorable. In other words, the processing module indicates that the plurality of sets of dispersed storage resources is required when none of the sets of dispersed storage resources by itself has the appropriate capability.

The processing module identifies the plurality of sets of dispersed storage resources when the processing module determines that the required dispersed storage resources requires a plurality of sets of dispersed storage resources. For example, the processing module identifies the plurality of sets of dispersed storage resources by determining capacity requirements and capability requirements based on the properties of the streaming data. Next, the processing module determines available capacity of the plurality of sets of dispersed storage resources to produce pluralities of available sets of dispersed storage resources. The determination may be based on one or more of but not limited to a resource assignment list, a resource loading indicator, an availability indicator, a query, a command, and a message. Next, the processing module determines capabilities of the pluralities of available sets of dispersed storage resources and selects the plurality of sets of dispersed storage resources based on the capacity requirements, the capability requirements, the available capacity, and the capabilities.

The processing module establishes a first error coding dispersed storage function parameters for a first set of dispersed storage resources of the plurality of sets of dispersed storage resources. For example, the processing module establishes at least one of but not limited to a segmenting protocol, a pre-slice data manipulation function, a forward error correction encoding function, a slicing pillar width, and a post-slice data manipulation function.

The processing module enables partitioning of the streaming data into a plurality of data streams. For example, the processing module controls MUX 154 to establish a routing pattern to route the streaming media 150 to one or more data segment generators as controlled by the control unit of the grid module 82. The processing module of the control unit 162 may determine an initial routing pattern and may change the routing pattern from time to time as a function of time, resource loading, amount of the streaming media 150 already routed to a given data segment generator, and/or bit rate of the streaming media 150.

In an example of operation, the processing module of the control unit 162 controls MUX 154 to route the streaming media 150 to one output at a time sequencing to each data segment generator one after the other in an equal amount of time per step. In another example, the processing module may control the MUX 154 to send more streaming media 150 to data segment generator 2 158 than all the other data segment generators since data segment generator 2 158 has more processing capabilities. In another example, the processing module controls the MUX 154 to utilize just one data segment generator to better match the loading requirement of the streaming media 150. In another example, processing module controls the MUX 154 to route the streaming media 150 to two outputs at a time such that a first and a second data segment generators (and the subsequent grid module 82 functions) are always processing the same data such that a good second set (e.g., a path from the second data segment generator through the post-slice manipulator) may be utilized to store the slices if a first set fails. This may improve the overall reliability of the system.

In an instance of operation, the data segment generators 1-A 156 through 160 function as discussed previously in accordance with the operational parameters for a user vault. In another instance of operation, the data segment generators 1-A 156 through 160 may each function in accordance with dynamic operational parameters different than the operational parameters for the user vault. The processing module may determine the dynamic operational parameters for each of the data segment generators based on grid module 82 performance, resource loading, amount of the streaming media already routed to a given data segment generator, and/or bit rate of the streaming media 150. For example, the processing module may decrease the size of the segments when the grid module 82 is falling behind (e.g., trending to a point where it can't keep up with the streaming media 150) and the grid module 82 can process smaller segments more efficiently. In an example of operation, the processing module enables routing of a first data stream of a plurality of data streams (e.g., from the MUX 154) to a first set of dispersed storage resources, wherein the first set of dispersed storage resources (e.g., in the access module 80 in the grid module 82) converts the first data stream into pluralities of error coded data slices in accordance with the first error coding dispersed storage function parameters.

The first set of dispersed storage resources initiates the conversion of the first data stream into pluralities of error coded data slices by segmenting a portion of the first data stream into a plurality of data segments. Note that the processing module may determine the portion size based on loading factors as previously described. Next, the first set of dispersed storage resources may perform pre-slice data manipulation on the data segment in accordance with the first error coding dispersed storage function parameters. Next, the first set of dispersed storage resources encodes and slices a data segment of the plurality of data segments in accordance with the first error coding dispersed storage function parameters to produce a plurality of error coded data slices. Note that a second set of dispersed storage resources and more dispersed storage resources may produce further pluralities of error coded data slices and in aggregate the plurality of sets of dispersed storage resources produce pluralities of error coded data slices. In addition, the first set of dispersed storage resources may perform post-slice data manipulation on an error coded slice of the plurality of error coded data slices in accordance with the first error coding dispersed storage function parameters.

In an example of operation, grid module 82 receives data segment streams 1-G from the access module 80 and may process the data segments in parallel across dispersed storage sets 1-G to produce the pluralities of error coded data slices 152. In an instance, the operation of the pre-slice manipulator, the encoder, the slicer, and the post-slice manipulator is as previously discussed to create the series of n EC data slices 152 for each data segment in accordance with the operational parameters of the user vault. For example, dispersed storage set 1 creates and sends the n slices to the DSN memory for each of the data segments created by the data segment generator 1 156 and dispersed storage set 2 creates and sends the n slices to the DSN memory for each of the data segments created by the data segment generator 2 158 which sequentially follows the data segments produced by data generator 1. Note that it is possible that set 2 may start storing slices prior to set 1 finishing storing slices. The processing module may assign each sequence of segments (e.g., sequential sections of the streaming media 150 at the MUX 154 output) such that a set is processing a unique source ID such that the sets can independently (e.g., at different paces) produce and store slices in parallel. The processing module may update the user vault upon creation of a new source name for each section of the streaming media 150 such that subsequent retrievals may reference the user vault to determine the sequential list of source names that comprise the object name of the streaming media 150. Note that one or more of the gateway module, access module 80, or grid module 82 may assign the unique source name to each section of the streaming media 150.

Alternatively, the elements of sets 1-G may each function in accordance with dynamic operational parameters different than the operational parameters for the user vault. The processing module may determine the dynamic operational parameters for each of the elements of sets 1-G based on grid module 82 performance, resource loading, amount of the streaming media 150 already routed to a given set, and/or bit rate of the streaming media 150. For example, the processing module of control unit 162 may decrease the number of slices n per segment for one set when the set is falling behind (e.g., trending to a point where it can't keep up with the streaming media 150).

The processing module may monitor the performance of each set based on one or more of input vs. output, ingress data rate vs. egress data rate, queue depths, processor utilization, failures, error messages, messages from the DSN memory, and/or memory cache depths. The processing module may optimize the performance of the dispersed storage resources to keep up and store the streaming media 150 by one or more of adjusting the number of active sets, adjusting the amount of the stream fed to a set, adjusting how often data is sent to a set, adjusting the size of the data segments per set, the pre-slice manipulations per set, the type of encoding per set, the method to slice per set, the post-slice manipulations per set, and/or the number of sets to simultaneously process the same data. In an instance, the processing module determines required dispersed storage resources by assigning a predetermined number of sets of dispersed storage resources, monitoring an ingress rate of the streaming data, monitoring an encoded data egress rate and adjusting the number of sets of dispersed storage resources based on a comparison of the ingress rate of the streaming data to the encoded data egress rate.

Alternatively, or in addition to the method described previously, the processing module may establish second error coding dispersed storage function parameters for a second set of dispersed storage resources of the plurality of sets of dispersed storage resources. Next, the processing module enables routing of the first data stream to the second set of dispersed storage resources, wherein the second set of dispersed storage resources converts the first data stream into second pluralities of error coded data slices in accordance with the second error coding dispersed storage function parameters. Note that the processing module selects the first and second error coding dispersed storage function parameters from a set of error coding dispersed storage function parameters.

In an alternative embodiment, the processing module receives the streaming data and dispersed storage resource configuration information. In other words, the processing module receives at least some instructional information along with the streaming data. In an example of operation, the processing module enables the plurality of sets of dispersed storage resources to generate the pluralities of sets of error coded data slices when the dispersed storage resource configuration information indicates that the plurality of sets of dispersed storage resources is required. In other words, the dispersed storage resource configuration information includes a resource requirement indicator (e.g. indicating that the plurality of sets of dispersed storage resources is required). In another example of operation, the processing module interprets the dispersed storage resource configuration information to determine capacity requirements and capability requirements. Next, the processing module determines whether a set of the plurality of sets of dispersed storage resources has capacity and capabilities corresponding to the capacity requirements and the capability requirements. Next, the processing module enables the dispersed storage resource set to generate the pluralities of sets of error coded data slices when the set does have the capacity and capabilities corresponding to the capacity requirements and the capability requirements. The processing module enables the plurality of sets of dispersed storage resources to generate the pluralities of sets of error coded data slices when the set does not have the capacity and capabilities corresponding to the capacity requirements and the capability requirements.

In the alternative embodiment, the processing module allocates the plurality of sets of dispersed storage resources when the dispersed storage resource configuration information requires a plurality of sets of dispersed storage resources. Next, the processing module obtains error coding dispersed storage function parameters and partitions the streaming data into a plurality of data streams in accordance with the dispersed storage resource configuration information. Next, the processing module converts, via controlling the plurality of sets of dispersed storage resources, the plurality of data streams into pluralities of sets of error coded data slices in accordance with the error coding dispersed storage function parameters.

In another example of operation, the processing module receives first and second error coding dispersed storage function parameters and partitions the streaming data into first and second data streams. Next, the processing module converts, via a first set of the plurality of sets of dispersed storage resources, the first data stream into first sets of error coded data slices in accordance with the first error coding dispersed storage function parameters. Next, the processing module converts, via a second set of the plurality of sets of dispersed storage resources, the second data stream into second sets of error coded data slices in accordance with the second error coding dispersed storage function parameters.

In another example of operation, the processing module receives first and second error coding dispersed storage function parameters and partitions the streaming data into first and second data streams. Next, the processing module converts, via a first set of the plurality of sets of dispersed storage resources, the first data stream into first sets of error coded data slices in accordance with the first error coding dispersed storage function parameters. Next, the processing module converts, via a second set of the plurality of sets of dispersed storage resources, the first data stream into second sets of error coded data slices in accordance with the second error coding dispersed storage function parameters. Next, the processing module converts, via a third set of the plurality of sets of dispersed storage resources, the second data stream into third sets of error coded data slices in accordance with the first error coding dispersed storage function parameters. Next, the processing module converts, via a fourth set of the plurality of sets of dispersed storage resources, the second data stream into fourth sets of error coded data slices in accordance with the second error coding dispersed storage function parameters.

In another example of operation, the processing module replicates (e.g., a duplicate copy) a data stream to produce the streaming data. Next, the processing module receives first and second error coding dispersed storage function parameters and partitions the streaming data into a first copy of the data stream and a second copy of the data stream. Next, the processing module converts, via a first set of the plurality of sets of dispersed storage resources, the first copy of the data stream into first sets of error coded data slices in accordance with the first error coding dispersed storage function parameters. Next, the processing module converts, via a second set of the plurality of sets of dispersed storage resources, the second copy of the data stream into second sets of error coded data slices in accordance with the second error coding dispersed storage function parameters. In other words, in this example the processing module saves two copies of the data stream where a first copy may be a high-resolution version and a second copy may be a lower resolution version.

Figure 10:
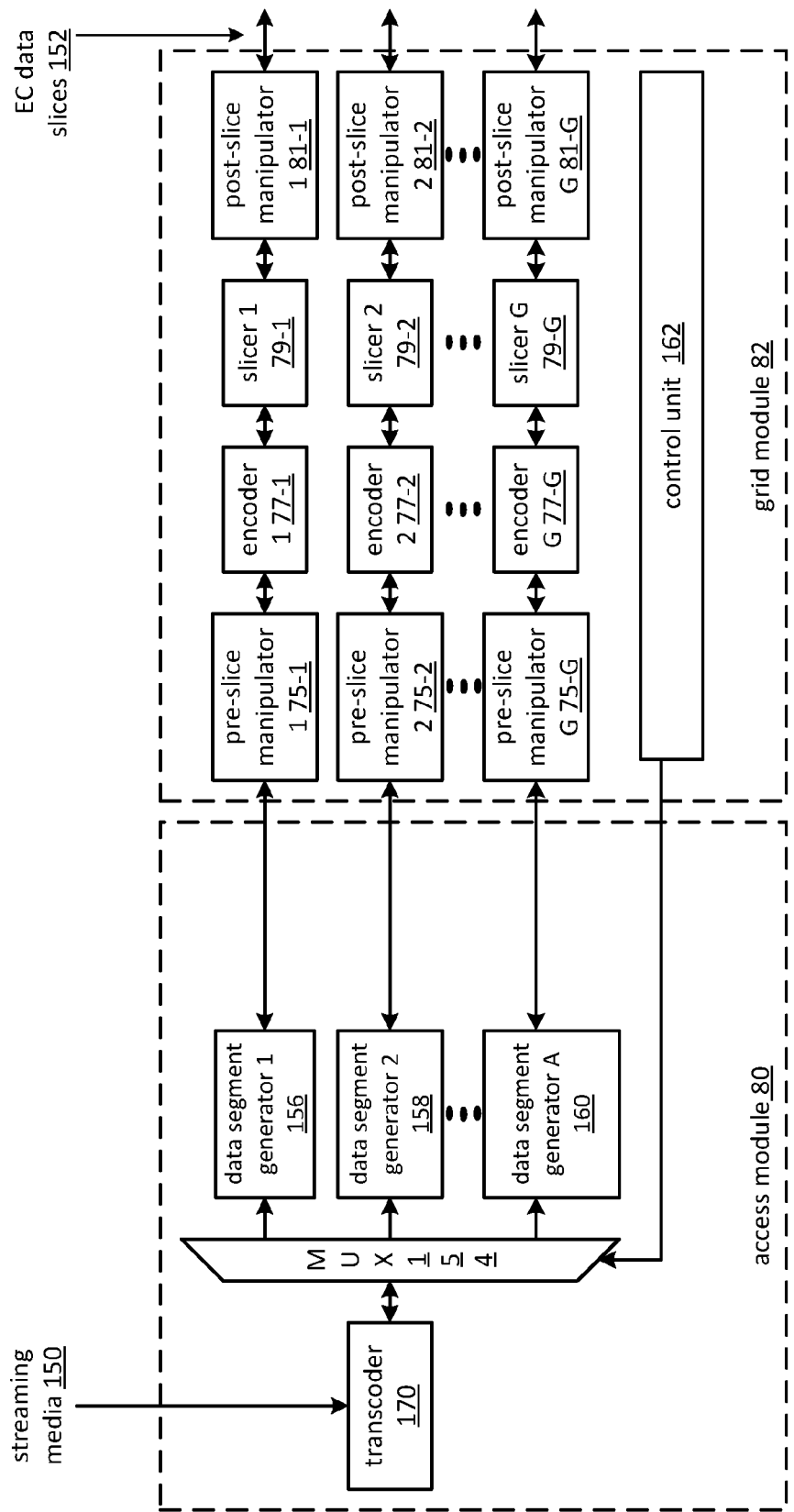
FIG. 10 is a schematic block diagram of another embodiment of an access module and grid module pair in accordance with the invention.
Figure 11:
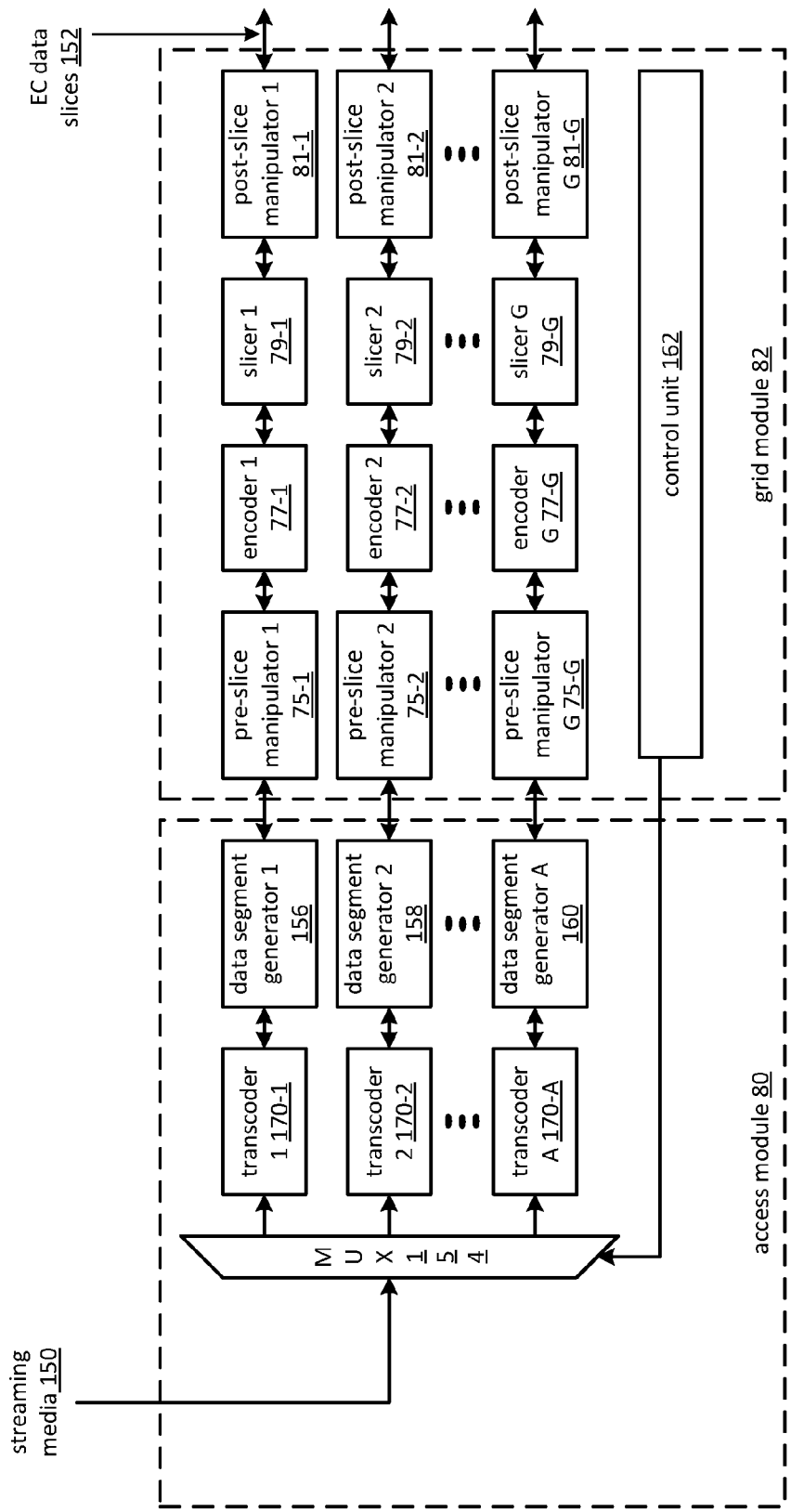
FIG. 11 is a schematic block diagram of another embodiment of an access module and grid module pair in accordance with the invention.

FIG. 10 and FIG. 11 are schematic block diagrams of another embodiment of an access module 80 and grid module 82 pair of a DS processing unit to receive the streaming media 150 and produce EC data slices 152 for storage in the DSN memory. Note that the streaming media may include streaming data. The streaming data further includes one or more of but not limited to high definition video, standard definition video, multi-media, music, broadcast, telephony, internet data, intranet data, communications assistance for law enforcement act (CALEA) information, and communication system link information. Note that the properties of the streaming data includes one or more of but not limited to file type, timestamp, data stream rate, resolution, aspect ratio, protocol indication, source location, user entered data, user ID, and pattern matching information.

As illustrated in FIG. 10, the access module 80 includes a transcoder 170, a MUX 154, and a plurality of data segment generators 1-A 156 through 160. As illustrated in FIG. 11, the access module 80 includes a plurality of transcoder modules 170-1 through 170-A, the MUX 154, and the plurality of data segment generators 1-A 156 through 160. Alternatively, the transcoder 170 may be implemented in any one or more modules of the DS processing unit or DS processing function (e.g., in the gateway module 78, in the grid module 82, etc.).

As illustrated in FIGS. 10-11, the grid module 82 includes a plurality of pre-slice manipulators 1-G 75-1 through 75-G, a plurality of encoders 1-G 77-1 through 77-G, a plurality of slicers 1-G 79-1 through 79-G, a plurality of post-slice manipulators 1-G 81-1 through 81-G, and a control unit 162. Note that the grid module 82 may also include a post-slice de-manipulator 89, a de-slicer 87, a decoder 85, and a pre-slice de-manipulator 83 (e.g., as described with reference to FIG. 4) to facilitate data retrieval from the DSN memory as described below. Further note that the control unit 162 may be implemented within any other modules of the DS processing unit and may further operably couple to any of the other modules to facilitate control of any of the other modules.

The transcoder 170 translates a portion of the coded streaming media 150 from a first standard format to a second standard format where the second format may represent the source media with a higher level of compression (e.g., at a lower rate) than the first standard format. Note that the bit rate of the output stream of the transcoder 170 may be lower than the bit rate of the input stream. For example, the transcoder 170 may convert incoming streaming media 150 from a high definition television (HDTV) format (e.g., 40 Mbps) to a standard definition television (SDTV) format (e.g., 4 Mbps). The transcoder 150 may be capable of receiving and identifying a wide variety of streaming media 150 first standard formats and may be capable of converting each to a wide variety of second standard formats.

A processing module of the control unit 162 may determine the second standard format based on one or more of operational parameters, time, resource loading, amount of the streaming media 150 already routed to a data segment generator, which data segment generator 1-A 156 through 160 is next, performance of the DS processing module, commensurate with the selection of the encoder algorithm of the grid module 82, a predetermination, a command, a lookup, streaming media 150 type, user ID, object name, and bit rate of the streaming media 150. The processing module may control the transcoder to select the second standard format in accordance with the determination. For example, the processing module may select a different second standard format for each section of the streaming media 150 that is routed to a different dispersed storage resource set to create slices as described below. For example, with reference to FIG. 10, data segment generator 158, pre-slice manipulator 75-2, the encoder 77-2, slicer 79-2, and post-slice manipulator 81-2 comprise a second set of dispersed storage resources. In another example, with reference to FIG. 11, transcoder 170-2, data segment generator 158, pre-slice manipulator 75-2, the encoder 77-2, slicer 79-2, and post-slice manipulator 81-2 comprise a second set of dispersed storage resources.

In an example of operation of a dispersed storage of streaming multi-media data scenario, the processing module receives streaming multi-media data and determines dispersed storage preferences for the streaming multi-media data. The determination may be based on one or more of but not limited to reading the dispersed storage preferences, reading a portion of the streaming multi-media data, analysis of a timed sequence of the streaming data, a table lookup, a command and a message. The dispersed storage preferences may include one or more of but not limited to a transcoding method, transcoding parameters, an error coding dispersed storage function, error coding dispersed storage function parameters, operational parameters, and dispersed storage resource requirements.

In an example of operation, with reference to FIG. 10, the processing module transcodes the streaming multi-media data into transcoded data when the dispersed storage preferences include transcoding. Next, the processing module partitions, via MUX 154, the transcoded data into a plurality of transcoded data streams in accordance with the dispersed storage preferences. Note that the processing module may change the partitioning from time to time as a function of time, resource loading, amount of streaming multimedia data already routed to a data segment generator, and/or a bit rate of the streaming multimedia data. Next, the processing module, via the data segment generators 156-160, produce a plurality of data segments corresponding to the transcoded data streams. Additionally, the processing module may perform pre-slice data manipulation on a data segment of the plurality of data segments. The processing module sends the plurality of data segments to the grid module 82 for further processing to create and store slices as described below.

In an example of operation, with reference to FIG. 11, the processing module determines whether to partition the streaming multi-media data, via MUX 154, into a plurality of data streams based on the dispersed storage preferences. The processing module transcodes, via transcoders 170-1 through 170-A, each of the plurality of data streams to produce a plurality of transcoded data streams in accordance with the dispersed storage preferences when the streaming multi-media data is to be partitioned into the plurality of data streams. In an instance, the processing module controls MUX 154 to route the streaming multi-media data to one output at a time sequencing to each transcoder one after the other in an equal amount of time per step. In another instance, the processing module may control MUX 154 to send more streaming multi-media data to transcoder 2 172-2 than all the other transcoders when the processing module determines that transcoder 2 172-2 (or the other components in the dispersed storage resource set of transcoder 2 172-2) has more processing capabilities. In another example, the processing module controls MUX 154 to send streaming multi-media data to just one transcoder to better match the loading requirement of the streaming multi-media data 150. In another example, the processing module controls MUX 154 to route the streaming multi-media data 150 to a first set and second set of disperse storage resources at a time such that two transcoders (and the subsequent data segment generator and grid module 82 functions) are always processing the same data such that an operational second set (e.g., a path from the transcoder through the post-slice manipulator) may continue to store the slices when the first set fails. This may improve the overall reliability of the system.

Next in the continuing example of FIG. 11, the processing module, via the data segment generators 156-160, produce a plurality of data segments corresponding to the plurality of transcoded data streams. Next, the processing module encodes each of the plurality of transcoded data streams into a plurality of sets of error coded data slices as the pluralities of error coded data slices by sending the plurality of data segments to the grid module 82 for further processing to create and store slices as described below.

The processing module of the grid module 82 receives the plurality of data segments of the transcoded data from the access module 80 and produces the pluralities of error coded data slices 152 in accordance with an error coding dispersal storage function of the dispersed storage preferences as described below. The processing module encodes a data segment of the plurality of data segments of the transcoded data to produce encoded segments in accordance with the error coding dispersal storage function. The processing module slices the encoded segments to produce the pluralities of error coded data slices in accordance with the error coding dispersal storage function. Additionally, the processing module may perform post-slice data manipulation of an error coded data slice of the pluralities of error coded data slices. The processing module outputs the pluralities of error coded data slices to a plurality of data storage units for storage.

In an example of a retrieval operation, the processing module retrieves previously stored streaming multi-media data from a dispersed storage system as described below. The processing module determines dispersed storage retrieval preferences for the streaming multi-media data. The determination may be based on one or more of but not limited to information received in a retrieve streaming multi-media data request, a user ID, a vault ID, a vault lookup, a predetermination, a message, and a command. The processing module accesses a plurality of data storage units to retrieve pluralities of error coded data slices. Note that the processing module may retrieve a plurality of sets of error coded data slices as the pluralities of error coded data slices. In addition, the processing module may perform post-slice data de-manipulation of an error coded data slice of the pluralities of error coded data slices.

The example of the retrieval operation continues with the processing module decoding at least a threshold number of the error coded data slices in accordance with an error coding dispersed storage function of the dispersed storage retrieval preferences to produce a decoded data segment for each plurality of the pluralities of error coded data slices. In addition, the processing module may perform pre-slice data de-manipulation of the decoded data segment. The processing module aggregates the decoded data segments to produce a retrieved multi-media data or data stream. In an instance, the processing module may determine not to utilize transcoding when the dispersed storage retrieval preferences indicate that transcoding was not utilized during a previous storage sequence. Note that the processing module decodes the plurality of sets of error coded data slices into a corresponding plurality of data streams and combines the plurality data streams into the retrieved multi-media data when transcoding is not utilized. Next, the processing module outputs the streaming multi-media data.

In another instance, the processing module may determine to utilize transcoding when the dispersed storage retrieval preferences indicate that transcoding was utilized during a previous storage sequence. In an example with reference to FIG. 10, the processing module retrieves a plurality of sets of error coded data slices as the pluralities of error coded data slices and decodes the plurality of sets of error coded data slices into a corresponding plurality of data streams. Next, the processing module aggregates the plurality of data streams into the retrieved multi-media data. Next, the processing module transcodes the retrieved multi-media data into the streaming multi-media data when the dispersed storage retrieval preferences include transcoding. Next, the processing module outputs the streaming multi-media data.

In another example of utilizing transcoding in the retrieval process, with reference to FIG. 11, the processing module retrieves a plurality of sets of error coded data slices as the pluralities of error coded data slices and decodes the plurality of sets of error coded data slices into a corresponding plurality of data streams. Next, the processing module transcodes the corresponding plurality of data streams into a plurality of transcoded data streams. Next, the processing module combines the plurality of transcoded data streams into the streaming multi-media data. Next, the processing module outputs the streaming multi-media data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for controlling dispersed storage of streaming data, the method comprises:
   determining properties of the streaming data;
   determining required dispersed storage resources based on the properties of the streaming data;
   when the required dispersed storage resources requires a plurality of sets of dispersed storage resources:
      identifying the plurality of sets of dispersed storage resources;
      establishing first error coding dispersed storage function parameters for a first set of dispersed storage resources of the plurality of sets of dispersed storage resources;
      enabling partitioning of the streaming data into a plurality of data streams; and
      enabling routing of a first data stream of the plurality of data streams to the first set of dispersed storage resources, wherein the first set of dispersed storage resources converts the first data stream into pluralities of error coded data slices in accordance with the first error coding dispersed storage function parameters.

2. The method of claim 1, wherein the streaming data comprises one or more of high definition video, standard definition video, multi-media, music, broadcast, telephony, internet data, intranet data, communications assistance for law enforcement act (CALEA) information, and communication system link information, wherein the properties of the streaming data include one or more of file type, timestamp, data stream rate, resolution, aspect ratio, protocol indication, source location, user entered data, user ID, and pattern matching information.

3. The method of claim 1, wherein the determining the required dispersed storage resources further comprises:
   interpreting a rate of the streaming data;
   comparing the rate of the streaming data to capabilities of the plurality of sets of dispersed storage resources to produce a comparison; and
   when the comparison is unfavorable, indicating the required dispersed storage resources requires the plurality of sets of dispersed storage resources.

4. The method of claim 1, wherein the determining the required dispersed storage resources further comprises:
   assigning a predetermined number of sets of dispersed storage resources;
   monitoring an ingress rate of the streaming data;
   monitoring an encoded data egress rate; and
   adjusting the number of sets of dispersed storage resources based on a comparison of the ingress rate of the streaming data to the encoded data egress rate.

5. The method of claim 1, wherein the first set of dispersed storage resources converts the first data stream into pluralities of error coded data slices further comprises:
   segmenting a portion of the first data stream into a plurality of data segments; and
   encoding and slicing a data segment of the plurality of data segments in accordance with the first error coding dispersed storage function parameters to produce a plurality of error coded data slices of the pluralities of error coded data slices.

6. The method of claim 5 further comprises at least one of:
performing pre-slice data manipulation on the data segment in accordance with the first error coding dispersed storage function parameters; and
performing post-slice data manipulation on an error coded slice of the plurality of error coded data slices in accordance with the first error coding dispersed storage function parameters.

7. The method of claim 1, wherein the identifying the plurality of sets of dispersed storage resources further comprises:
determining capacity requirements and capability requirements based on the properties of the streaming data;
determining available capacity of the plurality of sets of dispersed storage resources to produce pluralities of available sets of dispersed storage resources;
determining capabilities of the pluralities of available sets of dispersed storage resources; and
selecting the plurality of sets of dispersed storage resources based on the capacity requirements, the capability requirements, the available capacity, and the capabilities.

8. The method of claim 1, wherein the establishing of the first error coding dispersed storage function parameters further comprises at least one of:
establishing a segmenting protocol;
establishing a pre-slice data manipulation function;
establishing a forward error correction encoding function;
establishing a slicing pillar width; and
establishing a post-slice data manipulation function.

9. The method of claim 1 further comprises:
establishing second error coding dispersed storage function parameters for a second set of dispersed storage resources of the plurality of sets of dispersed storage resources; and
enabling routing of a second data stream of the plurality of data streams to the second set of dispersed storage resources, wherein the second set of dispersed storage resources converts the second data stream into second pluralities of error coded data slices in accordance with the second error coding dispersed storage function parameters, wherein the first and second error coding dispersed storage function parameters are selected from a set of error coding dispersed storage function parameters.

10. The method of claim 1 further comprises:
establishing second error coding dispersed storage function parameters for a second set of dispersed storage resources of the plurality of sets of dispersed storage resources; and
enabling routing of the first data stream to the second set of dispersed storage resources, wherein the second set of dispersed storage resources converts the first data stream into second pluralities of error coded data slices in accordance with the second error coding dispersed storage function parameters, wherein the first and second error coding dispersed storage function parameters are selected from a set of error coding dispersed storage function parameters.

11. A computer comprises:
an interface; and
a processing module operable to:
monitor, via the interface, streaming data;
determine properties of the streaming data;
determine required dispersed storage resources based on the properties of the streaming data;
when the required dispersed storage resources requires a plurality of sets of dispersed storage resources:
identify the plurality of sets of dispersed storage resources;
establish first error coding dispersed storage function parameters for a first set of dispersed storage resources of the plurality of sets of dispersed storage resources;
enable partitioning of the streaming data into a plurality of data streams; and
enable routing of a first data stream of the plurality of data streams to the first set of dispersed storage resources, wherein the first set of dispersed storage resources converts the first data stream into pluralities of error coded data slices in accordance with the first error coding dispersed storage function parameters.

12. The computer of claim 11, wherein the streaming data comprises one or more of high definition video, standard definition video, multi-media, music, broadcast, telephony, internet data, intranet data, communications assistance for law enforcement act (CALEA) information, and communication system link information, wherein the properties of the streaming data include one or more of file type, timestamp, data stream rate, resolution, aspect ratio, protocol indication, source location, user entered data, user ID, and pattern matching information.

13. The computer of claim 11, wherein the processing module further functions to determine the required dispersed storage resources by:
interpreting a rate of the streaming data;
comparing the rate of the streaming data to capabilities of the plurality of sets of dispersed storage resources to produce a comparison; and
when the comparison is unfavorable, indicating the required dispersed storage resources requires the plurality of sets of dispersed storage resources.

14. The computer of claim 11, wherein the processing module further functions to determine the required dispersed storage resources by:
assigning a predetermined number of sets of dispersed storage resources;
monitoring, via the interface, an ingress rate of the streaming data;
monitoring, via the interface, an encoded data egress rate; and
adjusting the number of sets of dispersed storage resources based on a comparison of the ingress rate of the streaming data to the encoded data egress rate.

15. The computer of claim 11, wherein the processing module converts the first data stream into pluralities of error coded data slices by:
segmenting a portion of the first data stream into a plurality of first data stream data segments; and
encoding and slicing a data segment of the plurality of data segments in accordance with the first error coding dispersed storage function parameters to produce a plurality of error coded data slices of the pluralities of error coded data slices.

16. The computer of claim 15, wherein the processing module further functions to perform at least one of:
pre-slice data manipulation on the data segment in accordance with the first error coding dispersed storage function parameters; and post-slice data manipulation on an error coded slice of the plurality of error coded data slices in accordance with the first error coding dispersed storage function parameters.

17. The computer of claim 11, wherein the processing module further functions to identify the plurality of sets of dispersed storage resources by:
    determining capacity requirements and capability requirements based on the properties of the streaming data;
    determining available capacity of the plurality of sets of dispersed storage resources to produce pluralities of available sets of dispersed storage resources;
    determining capabilities of the pluralities of available sets of dispersed storage resources; and
    selecting the plurality of sets of dispersed storage resources based on the capacity requirements, the capability requirements, the available capacity, and the capabilities.

18. The computer of claim 11, wherein the processing module further functions to establish the first error coding dispersed storage function parameters by at least one of:
    establishing a segmenting protocol;
    establishing a pre-slice data manipulation function;
    establishing a forward error correction encoding function;
    establishing a slicing pillar width; and
    establishing a post-slice data manipulation function.

19. The computer of claim 11, wherein the processing module further functions to:
    establish second error coding dispersed storage function parameters for a second set of dispersed storage resources of the plurality of sets of dispersed storage resources; and
    enable routing of a second data stream of the plurality of data streams to the second set of dispersed storage resources, wherein the second set of dispersed storage resources converts the second data stream into second pluralities of error coded data slices in accordance with the second error coding dispersed storage function parameters, wherein the first and second error coding dispersed storage function parameters are selected from a set of error coding dispersed storage function parameters.

20. The computer of claim 11, wherein the processing module further functions to:
    establish second error coding dispersed storage function parameters for a second set of dispersed storage resources of the plurality of sets of dispersed storage resources; and
    enable routing of the first data stream to the second set of dispersed storage resources, wherein the second set of dispersed storage resources converts the first data stream into second pluralities of error coded data slices in accordance with the second error coding dispersed storage function parameters, wherein the first and second error coding dispersed storage function parameters are selected from a set of error coding dispersed storage function parameters.

* * * * *